J. WOODWARD.
Plow.
No. 8,794.
Patented Mar. 9, 1852.
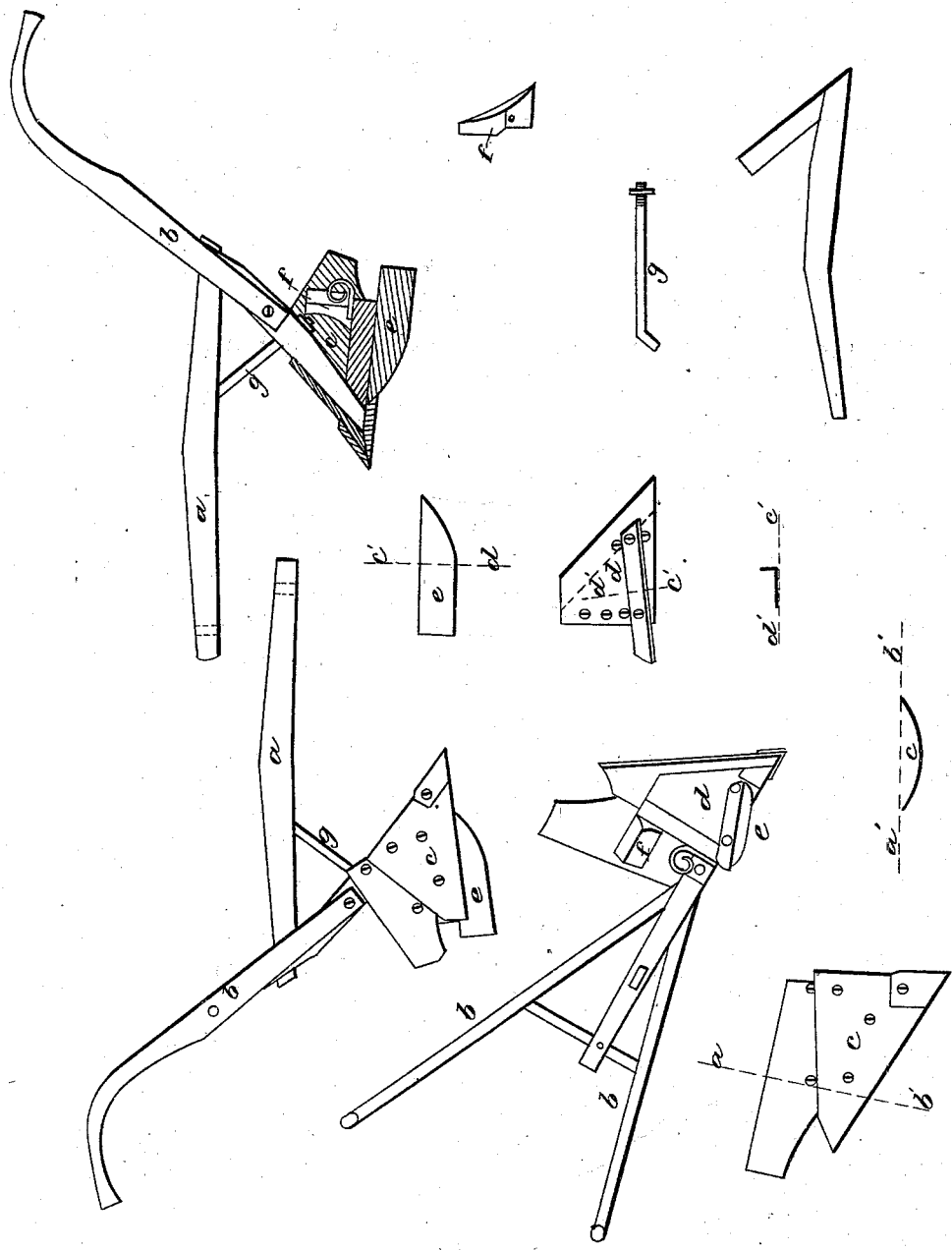

UNITED STATES PATENT OFFICE.

JOSHUA WOODWARD, OF HAVERHILL, NEW HAMPSHIRE.

IMPROVEMENT IN PLOWS.

Specification forming part of Letters Patent No. 8,794, dated March 9, 1852.

*To all whom it may concern:*

Be it known that I, JOSHUA WOODWARD, of Haverhill, in the county of Grafton and State of New Hampshire, have invented certain new and useful Improvements in Weeding Plows or Apparatus; and I do hereby declare that the following is a full, clear, and exact description of the principle or character which distinguishes it from all other things before known, and of the usual manner of making, modifying, and using the same, reference being had the accompanying drawing, making a part thereof.

The purpose of my invention is to furnish a weeder or plow that shall effectually eradicate the weeds from land with the least power in the steadiest and surest manner.

The construction is as follows:

The beam $a$, handles $b$, and mold board share $c$ are similar to many plows now in common use. Above the ordinary share I place a piece that insures the turning of the weeds under by curving over, as is sometimes effected more or less perfectly in ordinary plows. The sole of the plow $d$ is flat and solid, and upon it is secured an angle-plate, $e$, by proper bolts, so as to be shifted to or from the landside, and to the angle required for the work to be done, the angle being determined according to the direction to be given to the mold-board. The part perpendicular to the sole of the plow is thin, so as readily to cut its way into the ground when it has secure hold. By this means the ground is effectually cleared of weeds in the following way. The plate $e$ being set it is made to enter the ground, while the edge of the share just skims below the surface, eradiating the weeds as nearly up to the corn as is desirable, while it does not disturb the roots of the corn. The guide $e$ causes the plow to run steady throughout its whole course, which is absolutely necessary, especially where the ground is apt to clog, as any deviation under those circumstances at once prevents the moldboard from scouring.

It will be perceived that I make the upper part of the mold-board movable, and project its rear end out beyond the cutter, which is essential to effectually cover the weeds.

Having thus fully described my weeding-plow, what I claim therein as new, and for which I desire to secure Letters Patent, is—

The plate $e$, constructed, arranged, and combined with the plow, substantially in the manner and for the purpose set forth.

JOSHUA WOODWARD.

Witnesses:
 WM. GREENOUGH,
 J. BECKWITH WEST.